SYSTEM OF PRODUCING EVACUATED PACKAGES
Filed Dec. 18, 1941 2 Sheets-Sheet 1
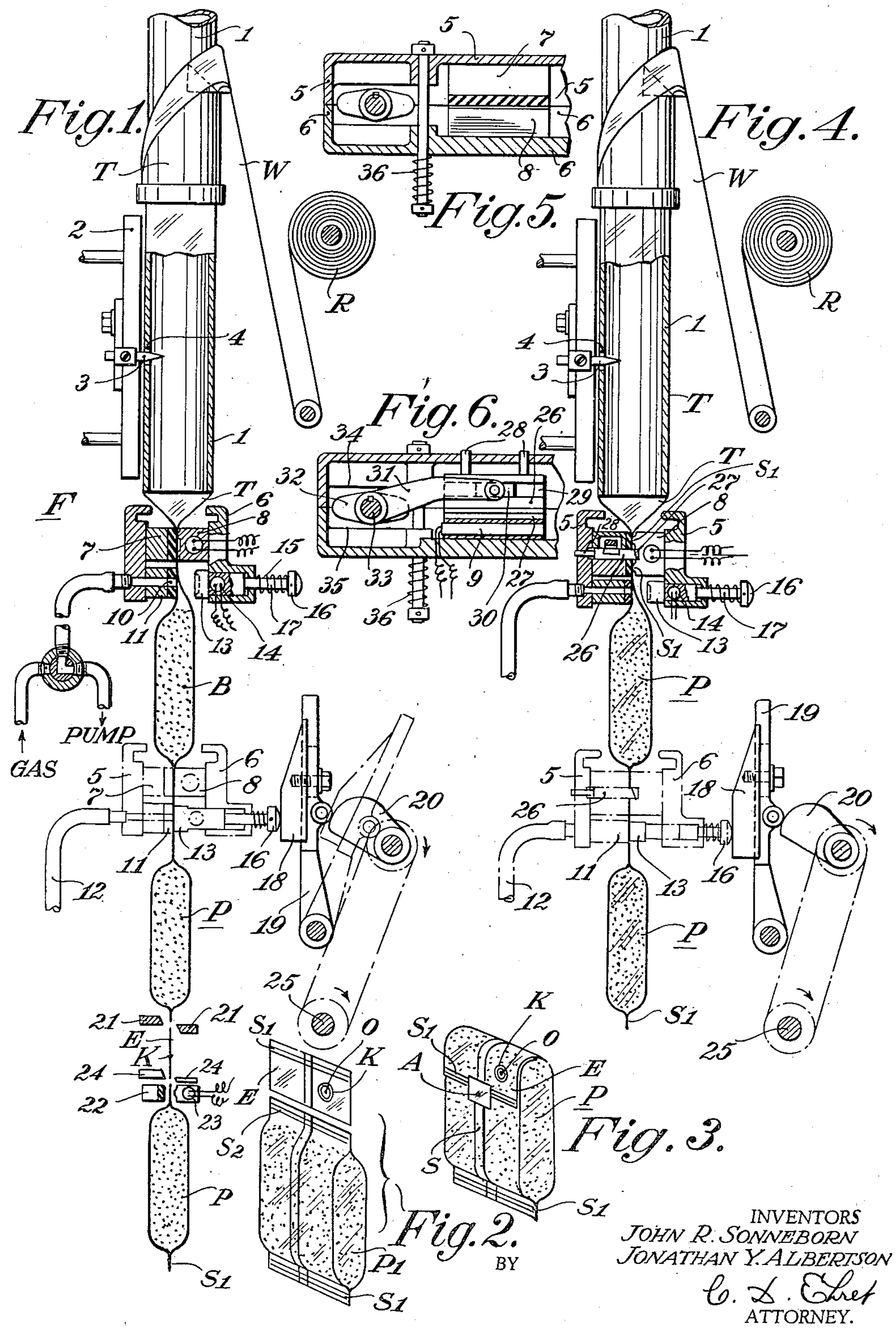
INVENTORS
JOHN R. SONNEBORN
JONATHAN Y. ALBERTSON
BY
C. L. Ehret
ATTORNEY.

SYSTEM OF PRODUCING EVACUATED PACKAGES
Filed Dec. 18, 1941 2 Sheets-Sheet 2
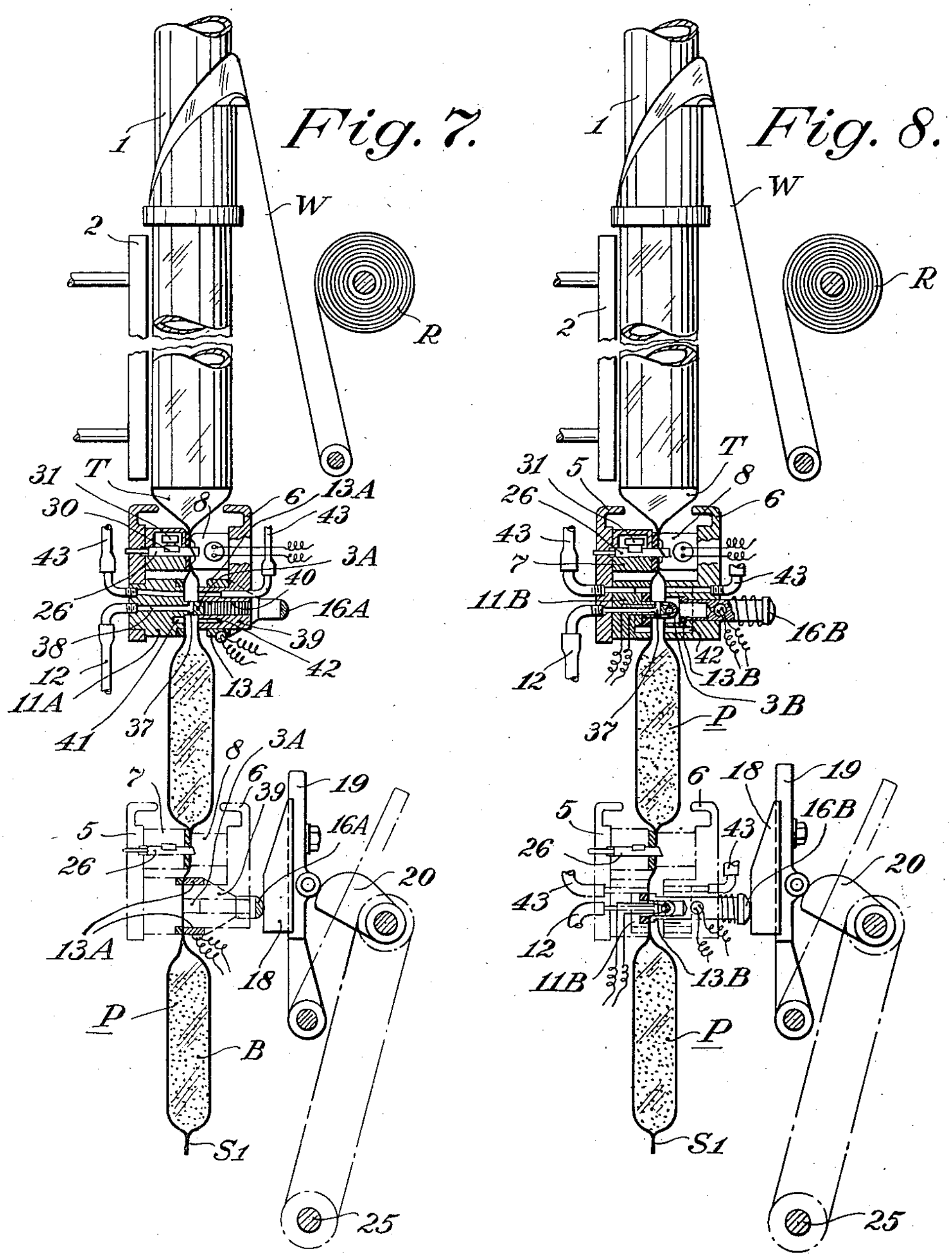
INVENTORS
JOHN R. SONNEBORN AND
JONATHAN Y. ALBERTSON
By C. L. Ehret
ATTORNEY.

Patented Oct. 30, 1945

2,387,812

UNITED STATES PATENT OFFICE 2,387,812

SYSTEM OF PRODUCING EVACUATED PACKAGES

John R. Sonneborn, Willow Grove, and Jonathan Y. Albertson, Philadelphia, Pa., assignors to Stokes and Smith Company, Philadelphia, Pa., a corporation of Pennsylvania Application December 18, 1941, Serial No. 423,476

30 Claims. (Cl. 93—3)

Our invention relates to systems for making from webbing, such as Pliofilm, Cellophane, and the like, sealed packages from which gas or vapor, generically termed "air," is withdrawn while the packages or containers are surrounded by air at atmospheric pressure and before their detachment from the webbing.

In accordance with our invention, before or concurrently with a flattening or sealing operation, a filled closed container is punctured for evacuation of air therefrom, and, before release of the evacuated container from the sealing or flattening tools, it is sealed between the puncture and the filling, as by application of heat and pressure when the web material is thermoplastic, to prevent re-entry of air.

In some forms of our invention, the sealed and filled container is held distended, as by externally applied suction, above the filling, and while so distended is pierced by a hollow punch through which the air is withdrawn from the container; the container is then re-sealed about the puncture before withdrawal of the punch, and preferably sealing, the external application of suction is discontinued.

Our invention further resides in the methods and in the apparatus having the features hereinafter described and claimed.

For an understanding of our invention and for illustration of various modifications thereof, reference is to be had to the accompanying drawings in which:

Fig. 1 discloses, in elevation, with parts omitted and parts broken away, significant elements of apparatus embodying and for practicing our invention;

Figs. 2 and 3, in perspective, illustrate packages produced by the method and apparatus of Fig. 1;

Fig. 4 discloses, in elevation, with parts broken away and parts in section, significant elements of another apparatus embodying and for practicing our invention;

Figs. 5 and 6 are fragmentary detail views of heat-sealing and web-severing elements shown in Fig. 4;

Figs. 7 and 8 disclose, in elevation, with parts omitted and parts broken away, significant elements of other apparatus embodying and for practicing our invention.

Referring to Fig. 1, the web W, of Pliofilm, Cellophane, or like sheet material, preferably of type which seals to itself upon application of heat and pressure, is fed from the supply roll R thereof about the web-shaping member 1 of any suitable cross-sectional shape, with the margins of the web overlapping to form a tube T extending beyond the end of the mandrel 1. The web is fed intermittently, as by mechanism hereinafter described, to form successive sections of tube T and between the successive feeding movements, the heated sealing plate or bar 2 is moved toward the form 1 to press together and seal the overlapping margins of the tube T thus to form seal S extending longitudinally of the tube T.

Concurrently with the formation of a section of a longitudinal seal S, the punch 3, or equivalent piercing tool, preferably attached to, or movable with the sealing tool 2, punctures the webbing and for that purpose preferably cooperates with an opening 4 in the form 1. By intermittent operation of the sealing tool 2 and the punch 3, there is produced from the webbing a continuous tube T with holes O spaced lengthwise thereof at intervals substantially corresponding with the length of the containers to be made therefrom. Less desirably, because of tendency of the webbing, particularly when of some materials, to stretch, the webbing may be punched before it is shaped about the form 1 to provide a similar series of holes. In any case, the diameter of the holes O is small; for example, within the range of from about $\frac{1}{32}$″ to about $\frac{1}{8}$″.

The arrangement illustrated for feeding the webbing comprises reciprocating structure F movable from the full line position, Fig. 1, representative of the beginning of the feeding stroke, to the dotted line position, representative of the end of the feeding stroke. As the web feeding structure F approaches or arrives at the full line position, the members 5, 6 thereof move toward one another from opposite sides of tube T to flatten it beyond the end of form 1. While the tube is so flattened, filling B is introduced through the hollow form 1.

The tools 7, 8 carried by members 5 and 6 respectively are sealing tools which transversely seal the tube T at S1 concurrently to form the top of one container and the bottom of another. At least one of the tools, for example 8, is heated as by the electric heater 9 and the other of them is preferably faced with neoprene, or equivalent yielding material, ensuring continuity of the seal.

The spacing between the successive holes O in the tube T is such that each time the tube is clamped by the sealing members 7, 8, or by auxiliary clamping members carried by members 5 and 6, one of the openings O is in alignment with port 10 of the suction member 11 attached to and movable with the feeding member 5. Member 11 is connected, as by the flexible hose 12, or equivalent, to a suction pump or other source of sub-atmospheric pressure.

During the descent of structure F to feed a length of webbing about the form 1, the air, or other gas or vapor, within the filled container is withdrawn; the tube above the filling P thereupon collapses under the effect of atmospheric pressure.

Before discontinuance of the suction and before release of the container by the clamping tools 7 and 8, the auxiliary sealing member 13, carried by and movable with respect to feeding member 6, is operated to seal the opening O of the container, as by heating and pressing together the opposite sides of the container surrounding the opening O, so to preclude re-entry of air.

In the particular arrangement shown in Fig. 1, the face of sealing tool 13 is circular, preferably with a central depression of diameter somewhat larger than the opening 10 in the suction member 11 with which aligned and is suitably heated, as by the electrical heater 14, when heat is required for sealing. The sealing tool 13 is biased away from the tube T, as by the spring 15 compressed between the head 16 of plunger 17 and an extension of the feeding member 6.

As the feeding structure F approaches the end of its feeding stroke, aforesaid head 16 engages the cam 18 adjustably carried by the pivoted arm 19 with the result the sealing tool 13 is moved, against the bias of spring 15, to the dotted line position shown in Fig. 1 thus to form an annular seal K about the opening O. Preferably the suction member 11 is faced with neoprene, or similar material, to provide a yielding sealing member with which the heated sealing member 13 coacts.

Before return of members 5 and 6 from the dotted line position of Fig. 1 to the full line position, the cam 20 which makes one revolution per cycle of the feeding mechanism moves clockwise from the full line position of Fig. 1 so to permit the cam 18 to be moved by a spring or other biasing means out of engagement with the head 16 of the lower sealing tool 13. Therefore the sealing members 11 and 13, as well as sealing members 7 and 8, are out of engagement with the webbing during the return, or upward, stroke of the web feeding structure F.

A predetermined charge of filling, usually in liquid or powdered form, is introduced into each container through the hollow form 1 at the beginning of or during the feeding stroke of the structure F so that substantially concurrently with exhaustion of air from one container, filling is introduced into the container next to be evacuated of air.

When it is desired to introduce a conditioning air or vapor into the filled containers, produced by this or any of the subsequently described arrangements, to preserve or enhance certain characteristics of the filling, the conditioning gas or vapor may be introduced through the tube 12 by transfer of its connection from the vacuum pump to a suitable source of conditioning gas and such connection is maintained until after operation of the auxiliary sealing tools 11, 13.

In the particular arrangement shown in Fig. 1, the evacuated filled containers are in succession detached from the webbing by knives 21 which operate while the web feeding structure F is at rest in the dotted line position.

The mechanism for effecting reciprocation of the feeding structure F, for effecting movement of the members 5 and 6 thereof toward and from engagement with the tube T of webbing, and for effecting operation of the knives 21 may be similar to that more fully illustrated and described in our Patent 2,200,971 granted May 14, 1940; cam 20 for controlling the auxiliary sealing tool 13 may be driven from shaft 25 corresponding with shaft 31 of aforesaid Patent 2,200,971.

The package P produced in accordance with the method and by the apparatus thus far described, has above the filling B a flat portion E of appreciable length in which there is included the circular seal K between the filling and the transverse seal S1 formed by the tools 7, 8. This portion or flap E which remains flat because of atmospheric pressure may be folded over an end of the package P, as shown in Fig. 3, and held in position as by a tab A adhesively joined to the flap and to a side wall of the package.

To produce the type package P1 shown in the lower part of Fig. 2, devoid of such flap E, each package P may, subsequent to exhaustion of air therefrom, be transversely sealed as at S2 above the filling and below the annular or circular seal K. The sealing tools 22, 23 for producing seal S2 may be in general similar to sealing tools 7 and 8 and may be carried by or movable with the structures which carry knives 21, 21. The second set of knives 24, 24 preferably movable with the knives 21, 21 detach from the top of the container portion E of the webbing including the transverse seal S1 and the circular seal K.

When performed by the apparatus described, the production of packages is continuous—notwithstanding the feed of the web is intermittent—in the sense that the steps of converting the webbing into a tube, the sealing operations which define each container, the filling of the container, the exhaustion of air, and sealing of the puncture all follow without substantial lapse of time between any of the successive steps.

The arrangement shown in Fig. 4 is generally similar to that of Fig. 1 except that instead of employing knives 21 to cut the web between a package clamped by members 7, 8 and a package suspended therefrom, there is utilized the knife 26 carried by and movable with respect to feeding member 5 to cut the webbing between a package clamped by members 7, 8 and the package next to be filled and sealed. For co-operation with knife 26, the sealing member 8 carried by the other feeding member 6 is provided with recess 27 extending across the face of sealing tool 8 between the raised portions thereof which produce the seals S1, S1. The lower edge of knife 26 and the lower edge of the recess 27 form shears which transversely sever the webbing before the clamping members 7, 8 release it at or near the end of a feeding stroke of structure F.

The knife 26, Fig. 6, is guided in its movements by pins 28 or equivalent slidably received by openings in member 5; the upper face of the knife is grooved at 29 to receive the block 30 pivotally mounted on arm 31 attached to or movable with cam member 32 angularly movable with shaft 33, corresponding with one or the other of shafts 58, 58A of our aforesaid patent, which controls the movement toward and from each other of the web feeding members 5, 6.

After cam 33 in moving in clockwise direction to the position shown in Fig. 6 has passed beyond engagement with the shoulders 34, 35 of members 5, 6 to effect clamping engagement of members 7, 8 with the web under control of biasing springs 36, one of which is shown, the continued movement of cam 32 effects movement of knife 26 (to the right, Fig. 4,) with respect to member 7 to the position shown in Fig. 4. By such movement, knife 26 co-acts with the shearing edge of recess 27 in member 8 to detach the container to be evacuated, in the immediately following feeding stroke of structure F, from the webbing but the container is not free to move with respect to the webbing until released by clamping members 7, 8 at or near the end of the feeding stroke, after that container has been evacuated and then re-sealed by tool 13 as described in connection with Fig. 1.

The arrangement shown in Fig. 7 is similar to Fig. 4 except punch 3 is omitted and replaced by punch 3A movable with member 5 of the feeding mechanism F. There is thus avoided need to adjust punch 3 and/or the forming tube 1 when it is desired to change the length of the package to be made.

The punch 3A is of cylindrical, or other suitable cross-section and is provided with one or more ports 37 which when the parts are in the position shown in Fig. 7, affords a path for flow of air through passage 38 of member 11A and hose 12 connected to a suction pump, or equivalent.

The die member 39 having recess 40 which receives the punch 3A is carried by member 6 of the feeding mechanism F; recess 40 extends through the die 39 to allow escape of the pieces of webbing removed by the punch in formation of the holes O.

To hold the upper part of the container distended during withdrawal of air therefrom, pressure, suitably below ambient or atmospheric pressure, is applied thereto; more particularly, the die member 39 and the member 11A are provided with channels 41, 42 of annular or other suitable shape each connected as by a hose-pipe 43 to a suction pump, or other suitable source of sub-atmospheric pressure suitably less than the internal pressure within the container during removal of air therefrom. Valves, not shown, control supply of suction to the pipes 12, 43 in timed relation to reciprocation of feeding structure F; application of suction is discontinued at or near the end of the feeding stroke of structure F.

The sealing tool 13A, having the purpose and function of the sealing tool 13 of Figs. 1 and 4, is slidable upon die member 39; it is moved, in opposition to a biasing spring not shown, to re-seal each package after wtihdrawal of air therefrom by engagement with cam 18 as in the arrangement of Figs. 1 and 4.

To produce packages of the type exemplified by package P1, Fig. 2, there may be added to the mechanism shown in Figs. 4, 7 or 8, the knives 24 and sealing tools 22, 23 of Fig. 1 for sealing the package at S2 between the filling B and the sealed puncture O and for removing the flap E including seals S1 and K.

Except in respects particularly discussed the arrangement shown in Fig. 8 is similar to Fig. 7; in this modification of our method and apparatus, the punch 3B, in general equivalent to punch 3A of Fig. 7, is heated to temperature sufficiently high to vaporize, or to burn its way through, the area of webbing with which it is brought into contact upon movement toward one another of members 5, 6 of the web-feeding device F. The holes O so produced have no rough or ragged edge and their formation is without litter.

After withdrawal of air from each package, it is sealed between the filling B and opening O by the sealing members 11B, 13B, both of which are heated, generally equivalent to sealing members 11, 13 of Figs. 1 and 4, and to sealing members 11A, 13A of Fig. 7. As in the preceding modifications, the seal K blocks all paths through which air would otherwise enter the container upon release thereof by clamping members 7, 8. Preferably, seal K is annular and of internal diameter substantially equal to or only slightly larger than the diameter of hole O which is as small as possible, for example of the order of ⅛ inch; to that end, the bore of the sealing member 13B quite closely corresponds in size with punch 3B.

Our invention is not limited to use of a single web or to the cases in which the longitudinal seal S is, as herein illustrated by way of example, flush with or in the contour of the tube; as exemplary of other types of packages which may be made and from which air may be removed in accordance with our invention reference is made to United States Letters Patent 2,260,064; 2,259,866; 2,257,823; 2,154,521 and 2,146,831.

What we claim is:

1. A method of making a container from a tube of webbing which comprises puncturing the tube, transversely flattening and sealing the tube on opposite sides of the puncture to form the closed ends of a container, introducing filling into the container after formation of one of its ends, withdrawing air through the puncture from the closed filled container while it is exteriorly exposed to atmospheric pressure, and sealing the container between the filling and the puncture.

2. A method of making a container from a tube of webbing which comprises puncturing the webbing, transversely clamping the tube, and while so clamped performing at least the operations of transversely sealing the tube to form the closed end of a filled container, withdrawing air through the puncture from the container while it is exteriorly subjected to atmospheric pressure, sealing the container between the filling and the puncture, and thereafter transversely severing the webbing to detach the filled, evacuated container from said tube.

3. A method of making and filling a container which comprises transversely clamping a tube of webbing and while so clamped performing the operations of transversely sealing the tube to form the closed end of a container, introducing filler into the container, puncturing the container, withdrawing air through the puncture from the container while externally subjected to atmospheric pressure, sealing the container between the filling and the puncture, and transversely severing the webbing to detach the filled, evacuated container from the tube.

4. A method of making a container from a tube of webbing which comprises puncturing the webbing, transversely clamping the punctured tube, and performing at least the operations of transversely sealing the tube to form the closed end of a filled container, introducing filling into the container through the puncture withdrawing air from the container while externally subjected to atmospheric pressure, sealing the container between the filling and the puncture, and transversely severing the webbing to detach the filled, evacuated container from the tube.

5. A method of making a container from a tube of webbing which comprises puncturing the webbing, introducing filling into and transversely clamping the tube, and while it is surrounded by air at atmospheric pressure performing at least the operations of transversely sealing the tube to form the closed end of a filled container, withdrawing air from the container through the puncture, sealing the container between the filling and the puncture and transversely severing the webbing for detachment of the filled evacuated container therefrom.

6. A method of making a container from a tube of webbing which comprises introducing filling into and transversely clamping the tube, and while so clamped performing the operations of transversely sealing the tube to form the closed end of a filled container, puncturing the container, through the puncture withdrawing air from the container while externally subjected to atmospheric pressure, sealing the container between the filling and the puncture and thereafter transversely severing the webbing for detachment of the container therefrom.

7. A method of making a container from a tube of webbing which comprises puncturing the webbing, introducing filling into and transversely clamping the punctured tube, and while so clamped performing at least the operations of transversely sealing it to form the closed end of a filled container, through the puncture withdrawing air from the container while externally subjected to atmospheric pressure, sealing the container between the filling and the puncture, and transversely severing the webbing for detachment of the filled, evacuated container therefrom.

8. A method of sealing and exhausting air from a filled container of web material which comprises introducing filling into the container, sealing the container after introduction of filling and puncturing the webbing, withdrawing air from the sealed container through the puncture while it is surrounded by air at atmospheric pressure, and transversely sealing the container between the filling and the puncture.

9. A method of sealing and exhausting air from a filled container of web material which comprises introducing filling into the container, sealing the container after introduction of filling and puncturing the webbing, withdrawing air from the sealed container through the puncture while it is surrounded by air at atmospheric pressure, transversely sealing the container between the filling and the puncture, and transversely severing the webbing between the puncture and the transverse seal.

10. A continuous method of making containers from webbing which comprises shaping the webbing to form a tube, transversely sealing the tube at intervals longitudinally thereof to define containers, filling a container between successive of aforesaid sealing operations, puncturing the webbing at intervals longitudinally thereof in areas between the seal areas, evacuating air from each of the filled containers through the puncture in the webbing thereof while the container is externally subjected to atmospheric pressure, and in turn sealing each evacuated container between the filling therein and the puncture.

11. A continuous method of making containers from webbing which comprises the steps of shaping the webbing to form a tube, transversely sealing the tube at intervals longitudinally thereof to define containers, puncturing the webbing in advance of said steps at intervals longitudinally of the webbing in areas between the seal areas, filling each container in turn between successive sealing operations, through the puncture evacuating air from each of the filled containers while externally subjected to atmospheric pressure, in turn sealing each evacuated container between the filling therein and the puncture, and thereafter transversely severing the webbing in turn to detach each filled, evacuated container from the tube.

12. A continuous method of making containers from webbing which comprises shaping the webbing to form a tube, introducing filling into and transversely sealing the tube at intervals longitudinally thereof to define containers, substantially concurrently with aforesaid sealing puncturing a container between its filling and the transverse seal, through the puncture evacuating each container in turn while externally subjected to atmospheric pressure, and in turn sealing each evacuated container between the filling therein and the puncture.

13. A continuous method of making containers from webbing which comprises shaping the webbing to form a tube, introducing filling into and transversely clamping the tube at intervals longitudinally thereof, and while so clamped performing the steps of transversely sealing the tube to define the closed end of a container, thereafter puncturing the container between its filling and the transverse seal, through the puncture evacuating the container while externally subjected to atmospheric pressure, and sealing the evacuated container between its filling and the puncture.

14. A continuous method of making containers from webbing which comprises shaping the webbing to form a tube, transversely clamping the tube at intervals longitudinally thereof, and while so clamped performing the steps of transversely sealing the tube to define the closed end of a container, introducing filling into the container, thereafter puncturing the container between its filling and an unsealed portion of the container, through the puncture evacuating the container while externally subjected to atmospheric pressure, sealing the evacuated container between its filling and the puncture, and transversely severing the webbing to detach the container therefrom.

15. A continuous method of making containers from webbing which comprises shaping the webbing to form a tube, transversely clamping the tube at intervals longitudinally thereof temporarily to close it, and while so clamped performing the steps of transversely sealing the tube to define the closed end of a container, introducing filling into the container, thereafter puncturing the container between its filling and an unsealed portion of the container, through the puncture evacuating the container while externally subjected to atmospheric pressure, and sealing the evacuated container between its filling and the puncture, and subsequent to release from temporary closure of each evacuated container performing the steps of transversely sealing it between its filling and the puncture, and transversely severing the container between the last formed transverse seal and the puncture to detach the evacuated container from the webbing.

16. A method of exhausting a container made of webbing which comprises in either sequence distending the container by application of externally applied pressure below ambient pressure, puncturing the webbing, and withdrawing air from the container, while distended, through the puncture.

17. Apparatus for forming containers from a tube of webbing comprising means for sealing the tube longitudinally thereof, means for sealing the tube transversely at intervals longitudinally thereof to define containers, means operable with one of said sealing means for puncturing the webbing, and means for exhausting air from the successive containers through the punctures therein.

18. Apparatus for forming containers from a tube of webbing having small openings spaced from one another lengthwise of the tube, means for sealing the tube transversely at intervals longitudinally thereof to define containers each provided with at least one of said openings, means for filling the containers while undetached from said tube, means for exhausting air from the successive filled containers through the puncture therein while the containers are surrounded by air at atmospheric pressure, means for sealing each container between its filling and the puncture, and means for transversely severing the webbing in turn to detach the filled, evacuated containers from the tube.

19. Apparatus for forming containers from a tube of webbing comprising means for sealing the tube longitudinally thereof, means for sealing the tube transversely at intervals longitudinally thereof to form containers, means operable with one of said sealing means for puncturing the webbing, means for evacuating air from the containers through the punctures, means for feeding the webbing comprising members movable toward and from the webbing, and means comprising said members for sealing each of the evacuated containers against re-entry of air through the puncture.

20. Apparatus for forming containers from a tube of webbing comprising means for sealing the tube longitudinally thereof, means for sealing the tube transversely at intervals longitudinally thereof to form containers, means operable with one of said sealing means for puncturing the webbing, web feeding means including members movable toward and from each other to clamp upon and release the tube and reciprocable in unison axially of the tube to advance it step-by-step, means for evacuating air from each container comprising a ported member carried by one of said movable members for co-operation with the puncture in the container, and means for sealing the container after evacuation comprising a sealing member carried by one of said movable members.

21. Apparatus for forming containers from a tube of webbing comprising a movable member for sealing the tube longitudinally thereof, and structure movable with said sealing member for puncturing the wall of the tube at intervals longitudinally thereof for passage of gas therethrough.

22. Apparatus for forming containers from a tube of webbing comprising means for transversely flattening and sealing the tube to form containers and including members movable toward and from the tube, and means for exhausting air from the containers including structure carried by one of said members for puncturing the webbing.

23. Apparatus for forming containers from a tube of webbing comprising means for transversely flattening and sealing the tube to form containers and including members movable toward and from the tube, and means for exhausting air from the containers including a hollow punch carried by one of said members for puncturing each container and through which air is withdrawn from the container.

24. Apparatus for forming containers from a tube of webbing comprising means for transversely flattening and sealing the tube to form containers and including members movable toward and from the tube, means for exhausting air from the containers including structure carried by one of said members for puncturing the webbing and means for sealing the puncture of each evacuated container comprising a sealing member carried by the other of said members.

25. Apparatus for forming containers from a tube of webbing comprising reciprocable structure for feeding the tube and including members movable toward each other from opposite sides of the tube at or near the beginning of the feeding stroke of said structure, sealing tools movable with said members for transversely sealing the tube to define containers, a punch carried by one of said members for puncturing each container for exhaustion of air therefrom, a sealing tool carried by and movable with respect to the other of said members, and means for actuating said last-named sealing tool when said structure is at or near the end of its feeding stroke.

26. Apparatus for forming containers from a tube of webbing having small holes therethrough at intervals longitudinally thereof comprising reciprocable structure for feeding the tube and including members movable toward each other from opposite sides of the tube at or near the beginning of the feeding stroke of said structure, sealing tools movable with said members for transversely sealing the tube to define containers, means for exhausting each of the containers through one of said holes during a feeding stroke of said structure, a sealing tool carried by and movable with respect to one of said members, and means for actuating said last-named tool when said structure is at or near the end of its feeding stroke to seal the hole in the container exhausted during that stroke.

27. Apparatus for exhausting and sealing filled containers comprising suction means for holding the sealed container distended above the filling, a hollow punch for puncturing the container while held distended by said suction means, means for exhausting air from the container through said punch, and means for sealing the container about the puncture before withdrawal of said punch.

28. A method of sealing and exhausting air from a filled container of web material which comprises introducing filling into a container, puncturing the webbing, withdrawing air from the filled container while it is externally subjected to atmospheric pressure, and sealing the container between the filling and the puncture.

29. A method of making a container from a tube of webbing which comprises transversely flattening and sealing a tube to form a closed end of a container, introducing filling into the container, puncturing the container, withdrawing air through the puncture from the filled container while it is externally subjected to atmospheric pressure, and sealing the container between the filling and the puncture.

30. A continuous method of making containers and in succession filling and evacuating them which comprises feeding webbing and forming it into a tube, puncturing the tube at intervals, transversely sealing the tube to form closed ends of containers, introducing fillings into the containers, through a puncture of the tube evacuating air from each filled container while externally subjected to atmospheric pressure, in turn completing sealing of each filled evacuated container, and thereafter detaching from the tube the filled completely sealed and evacuated container.

JOHN R. SONNEBORN.
JONATHAN Y. ALBERTSON.